United States Patent
Ceccarelli

(10) Patent No.: US 8,726,803 B2
(45) Date of Patent: May 20, 2014

(54) APPARATUS FOR COMPACTING AND DEHYDRATION OF ORGANIC WASTE

(75) Inventor: Stefano Ceccarelli, Rieti (IT)

(73) Assignee: Techo SRL, Ferentino (FR) (IT)

(\*) Notice: Subject to any disclaimer, the term of this patent is extended or adjusted under 35 U.S.C. 154(b) by 306 days.

(21) Appl. No.: 13/257,463

(22) PCT Filed: Mar. 19, 2010

(86) PCT No.: PCT/IT2010/000122
§ 371 (c)(1),
(2), (4) Date: Sep. 19, 2011

(87) PCT Pub. No.: WO2010/106572
PCT Pub. Date: Sep. 23, 2010

(65) Prior Publication Data
US 2012/0017781 A1  Jan. 26, 2012

(30) Foreign Application Priority Data
Mar. 19, 2009  (IT) .............................. RM2009A0120

(51) Int. Cl.
*B30B 3/00*  (2006.01)
(52) U.S. Cl.
USPC ............ 100/145; 100/117; 100/146; 100/150
(58) Field of Classification Search
CPC ............ B30B 9/12; B30B 9/121; B30B 9/18; B30B 9/26; B30B 9/16; B30B 9/122; D21C 9/18; A21C 1/065; A47B 13/023
USPC .................. 100/117, 145, 146, 150
See application file for complete search history.

(56) References Cited

U.S. PATENT DOCUMENTS

| | | | | |
|---|---|---|---|---|
| 3,659,427 A | * | 5/1972 | Harza | 62/63 |
| 3,777,658 A | * | 12/1973 | Vosskuhler | 100/98 R |
| 4,170,936 A | * | 10/1979 | Eck | 100/39 |
| 4,528,098 A | * | 7/1985 | Treyssac et al. | 210/414 |
| 5,148,739 A | * | 9/1992 | Fox | 100/45 |
| 5,348,704 A | * | 9/1994 | Tanaka | 422/22 |
| 5,552,038 A | * | 9/1996 | Muller et al. | 210/86 |
| 5,662,035 A | * | 9/1997 | Lee | 100/112 |
| 5,960,711 A | * | 10/1999 | Nordin | 100/127 |
| 6,615,710 B1 | * | 9/2003 | Ishigaki et al. | 100/111 |
| 6,658,997 B2 | * | 12/2003 | Matsumoto | 100/45 |
| 7,073,433 B2 | * | 7/2006 | Burke et al. | 100/117 |
| 2005/0098049 A1 | * | 5/2005 | Shepherd | 100/117 |

FOREIGN PATENT DOCUMENTS

| | | |
|---|---|---|
| FR | 2 698 024 A1 | 5/1994 |
| GB | 2447612 A * | 3/2007 |
| GB | 2 447 612 A | 9/2008 |
| JP | 9 262574 A | 10/1997 |
| JP | 2007 260709 A | 10/2007 |
| WO | 2004/062900 A1 | 7/2004 |
| WO | 2008/000510 A2 | 1/2008 |

OTHER PUBLICATIONS

International Search Report, dated Jul. 29, 2010, from corresponding PCT application.

\* cited by examiner

*Primary Examiner* — Shelley Self
*Assistant Examiner* — Onekki Jolly
(74) *Attorney, Agent, or Firm* — Young & Thompson

(57) ABSTRACT

An apparatus for compacting and dehydration of organic waste includes a first drawer, which is designed to receive organic material and/or kitchen-produced foodstuff waste and is equipped with mechanical elements for compacting and dehydration of the foodstuff waste, as well as a second drawer, underlying the first, which is designed to receive the compacted and dehydrated foodstuff waste that comes out of the first drawer.

25 Claims, 7 Drawing Sheets ized to be installed preferably in the compartment that is
APPARATUS FOR COMPACTING AND DEHYDRATION OF ORGANIC WASTE The present invention relates to the sector of electrical household appliances and in particular to an apparatus designed to compact and dehydrate domestic organic waste or organic waste produced by commercial establishments, which is to be installed preferably in the compartment that is commonly located under the kitchen sink.

Currently, electrical household appliances that are able to compact domestic organic waste and carry out at the same time dehydration thereof are not known.

Consequently, kitchen-produced foodstuff waste is thrown directly into rubbish bags.

This leads to a series of drawbacks.

A first drawback is represented by the fact that said rubbish bags are rapidly filled with domestic, organic waste, and a plurality of rubbish bags are consequently generated, which evidently occupy a considerable amount of space.

Consequently, neither the operations for collecting the refuse nor those of transport of the refuse nor stockage thereof are facilitated.

The purpose of the present invention is to overcome the above drawbacks by providing an electrical household appliance for the compacting and dehydration of domestic organic waste that reduces its volume by approximately 80-90% and the liquids present in said refuse by over 60%.

According to the invention, the above has been achieved by providing an apparatus that comprises:
 a first drawer, which is designed to receive the organic material and/or kitchen-produced foodstuff waste, such as for example chicken bones, water-melon peel, potato peel, apple peel, wet paper serviettes, and is equipped with mechanical means for the treatment of the foodstuff waste, which are designed to compact and dehydrate it;
 a second drawer, underlying the first, which is designed to receive said compacted and dehydrated foodstuff waste that comes out of the first drawer, for example falling by gravity, as well as the foodstuff waste to be thrown directly into said second drawer, such as for example bones of mutton, pork, or beef.

Also provided according to the invention are means of a known type, designed to convey the liquids that come out of said compacted and dehydrated foodstuff waste to a sewer.

A better understanding of the invention will be obtained from the ensuing detailed description with reference to the attached drawings, which illustrate, merely by way of example, a preferred embodiment.

Figure 1:
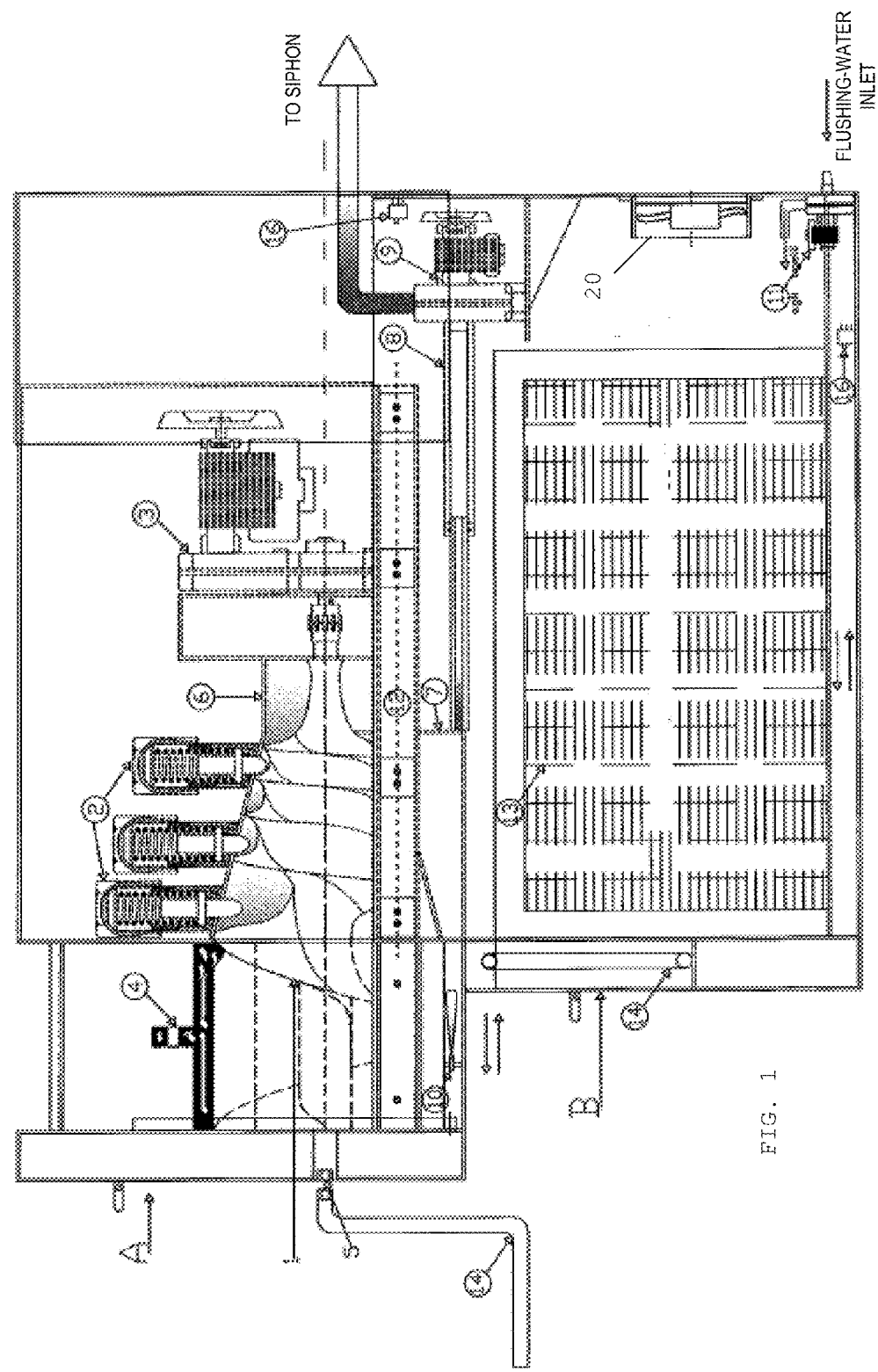
Figure 2:
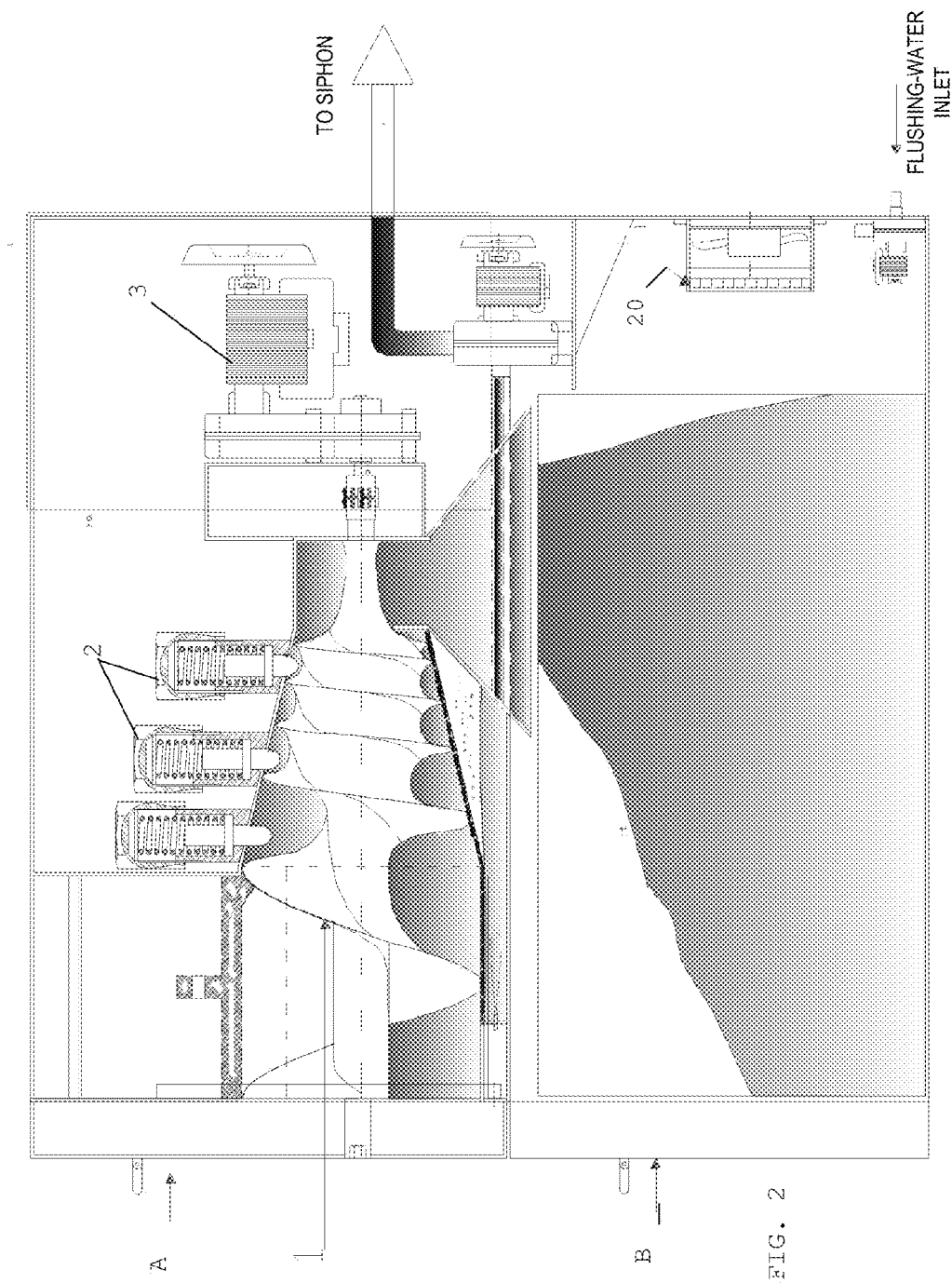
Figure 3:
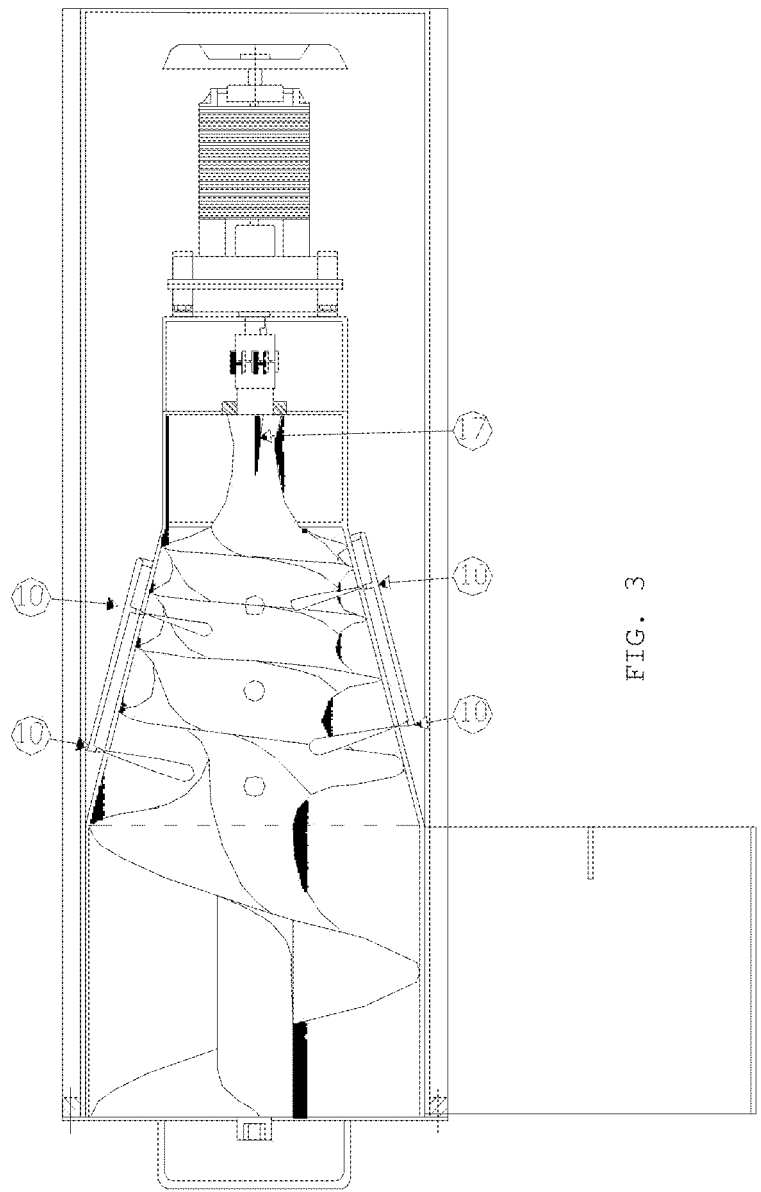
Figure 4:
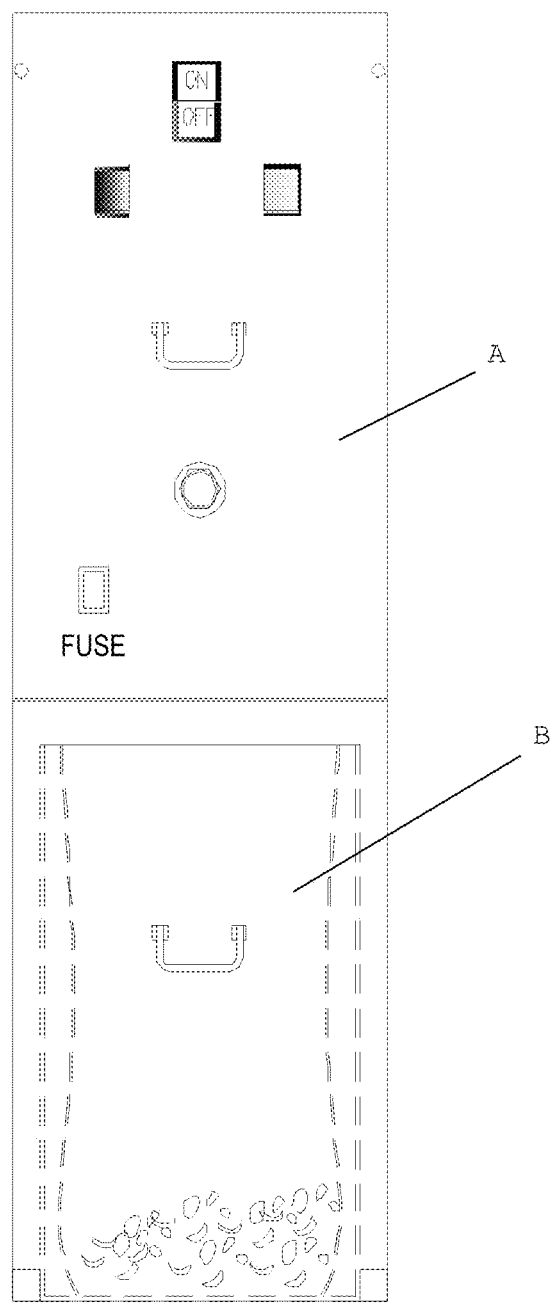
Figure 5:
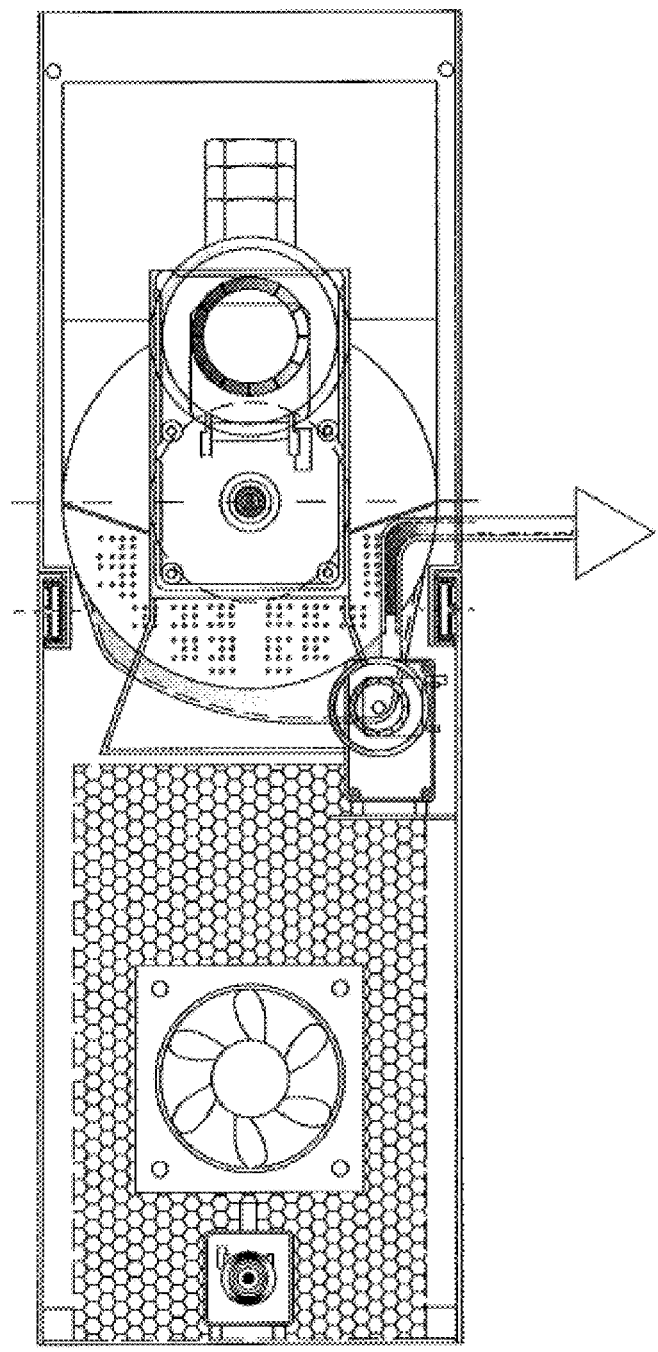
Figure 6D:
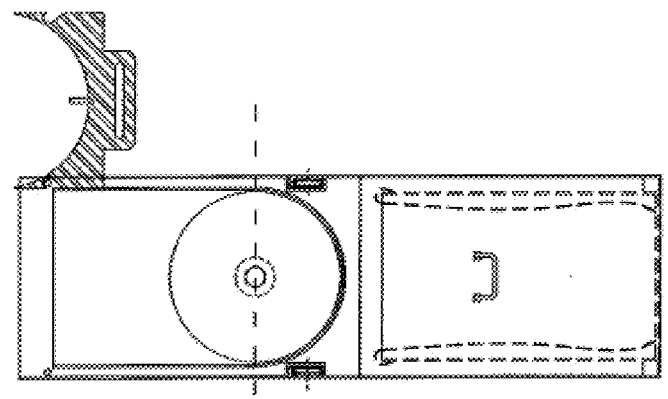
Figure 6C:
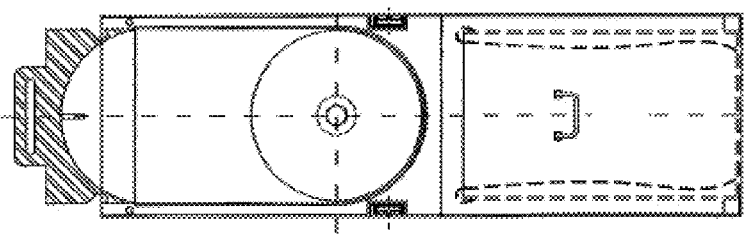
Figure 6B:
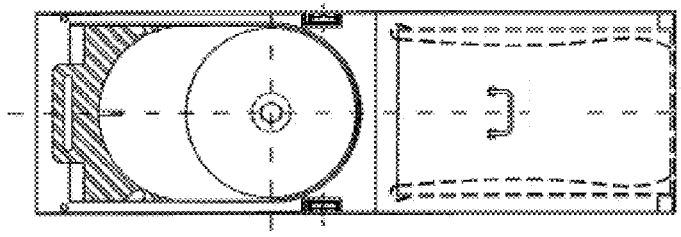
Figure 6A:
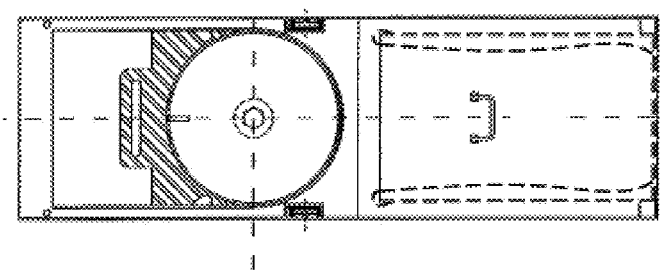
Figure 7:
Figure 8:
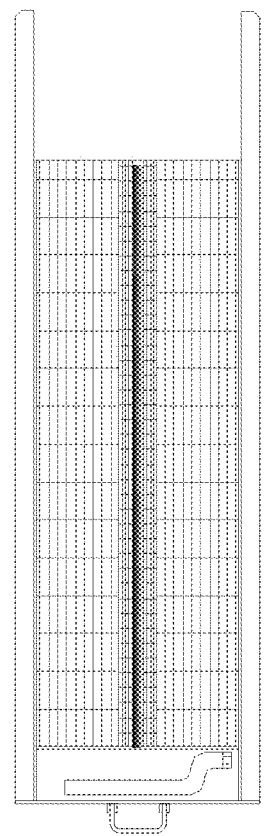
Figure 9:
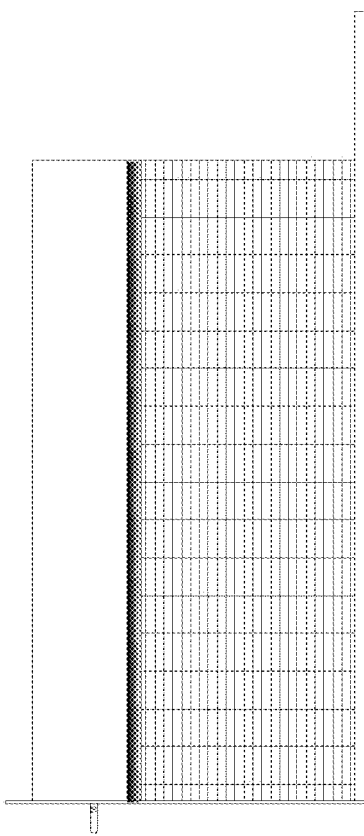
Figure 10:
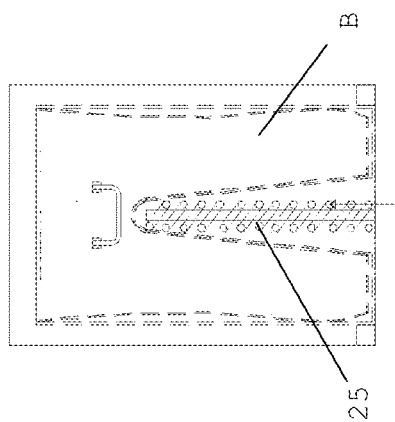
Figure 11:
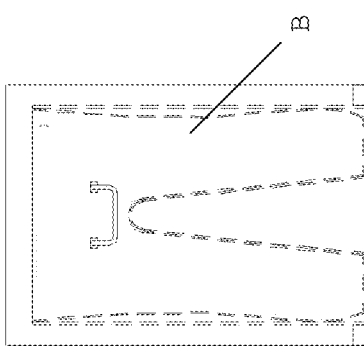

In the drawings:
FIG. 1 is a schematic illustration of a preferred embodiment of the apparatus for compacting and dehydration of domestic organic waste forming the subject of the invention;
FIG. 2 shows a longitudinal section of the apparatus of FIG. 1, in which the compacted and dehydrated refuse falls from a first drawer of the apparatus into a second drawer underlying said first drawer;
FIG. 3 is a top plan view of the apparatus with the loading compartment open;
FIG. 4 is a front view of the apparatus;
FIG. 5 shows the rear part of the apparatus of FIG. 1;
FIGS. 6A to 6D show the positions of the apparatus during opening for loading,
FIG. 7 shows a coil for refrigeration of the second drawer in which the compacted and dehydrated material is present;
FIGS. 8 and 9 are, respectively, a top plan view and a side view of the second drawer; and FIGS. 10 and 11 show the front part of the second drawer when this is closed and open, respectively.

With reference to the figures, in the preferred embodiment described, an apparatus for the compacting and dehydration of domestic organic waste is provided, which comprises:
 a first drawer A for loading of the organic material and/or of kitchen-produced foodstuff waste, equipped with mechanical means for the compacting and dehydration of said foodstuff waste; and
 a second drawer B, underlying said first drawer A, for collection of the compacted and dehydrated foodstuff waste and possibly of non-compactable waste to be introduced by hand.

In the example described, said mechanical means are substantially constituted by a wormscrew 1 designed to cause advance of the organic material introduced by the user into said first drawer A. According to the invention, by compressing and dehydrating said organic material, said wormscrew reduces the bulk thereof in such a way that the organic liquids contained therein comes out through a plurality of holes purposely provided in the lateral surface of the case of the wormscrew 1: in this way, a first dehydration of the organic materials caused by "squeezing" thereof is obtained.

The first drawer A moreover comprises:
 means for the collection, by gravity, of said organic liquids positioned underneath said wormscrew 1;
 means for conveying said organic liquids to a sewer;
 a motor reducer 3, designed to be connected to the wormscrew 1; and
 a loading and closing hatch 4 located on the top part of the wormscrew 1.

In the example described, said means for collecting the organic liquids are constituted by an outer casing 7, whilst the means for conveying said organic liquids to a sewer are constituted by a purposely designed pipe 8, which is to be connected to an extraction pump 9.

In the example described, said pipe 8 is a telescopic pipe.

In the example described, the wormscrew 1 is with variable pitch and/or with a number of starts.

In addition, the wormscrew 1 is self-cleaning and for this purpose is equipped with one or more cup pistons 2 that are positioned radially above said wormscrew and act directly on the cavities of the wormscrew 1 itself, favouring cleaning thereof, as well as conveying and feed of the organic material towards the outlet. In this way, in addition to cleaning of the wormscrew 1 itself, also complete emptying of the first loading drawer A is favoured.

The ascending movement of each piston is provided by the rotation of the wormscrew 1, whereas the descending movement is provided by at least one return spring housed in the cup of each piston.

Said wormscrew is housed in a case 6 having the shape of a truncated cone, which, as already mentioned, is provided with a plurality of holes for enabling the organic liquids of the "squeezed" organic material to flow into the collection casing 7.

For cleaning the apparatus a flushing cycle is envisaged, which is carried out at the end of processing. For this purpose, one or more spray nozzles 10 are provided, designed to be positioned in the strategic parts of the apparatus.

Each of said spray nozzles 10 is designed to be governed by a purposely provided timed solenoid valve connected to the water mains 11, or by a purposely provided electric pump in the absence of water pressure.

The first drawer A is designed to be moved along its longitudinal axis for the length necessary to enable loading of the organic material.

The second drawer B is equipped with a purposely designed bag for collection of the compacted and dehydrated foodstuff waste (compost), which drops by gravity from the first drawer A.

Provided in the proximity of the distal end of the wormscrew 1 are scraping means 17 preferably shaped for keeping the wormscrew 1 clean and for facilitating dropping of the compacted and dehydrated foodstuff waste into the underlying bag.

In the example described, said cutting means comprise at least one scraper blade.

In addition, it is preferable for the second drawer B to be equipped with means for extracting the air and conveying it towards the outside.

Said means for extracting and conveying the air towards the outside are positioned in the rear part of the apparatus and comprise a dehumidifier fan 20.

In order to improve ventilation and drop in weight of the compost, said fan 20 is set on a perforated wall.

It is also expedient to envisage that the air at outlet from the apparatus is made to pass through an activated-carbon filter to eliminate bad smells.

In the preferred embodiment described, the apparatus comprises means for refrigeration of the resulting material, which are designed to be fixed on the load-bearing structure.

With reference to FIGS. 7 to 11, in the example described, said refrigeration means comprise a coil 25, designed to be fixed vertically in a central position on the base of the load-bearing structure of the apparatus, on which the second drawer B slides.

Consequently, for the second drawer B to be free to slide on the base of the load-bearing structure without the coil 25 interfering with its travel, said second drawer is purposely shaped: it is in fact equipped with a central recess or tunnel that extends throughout the length of the drawer B itself with dimensions such as not to interfere with said coil 25 when it is opened or closed.

It is appropriate for also the bag present in the second drawer B to be shaped to enable, in addition to the possible refrigeration of the inside of the bag itself, a better ventilation of the product even in the absence of the coil 25.

The second drawer B moreover comprises a rigid frame having the external side walls 13 provided with holes for aeration of the compost and for a better positioning of the collection bag.

In addition, said drawer B has the rear wall full, whilst its front wall has a gap for enabling housing of a crank wrench 14 designed to unblock the wormscrew 1 in the event of possible clogging.

In the event of possible clogging of the wormscrew 1, in fact, the aforesaid crank wrench 14 is to be inserted in a purposely designed attachment provided on the shaft of the wormscrew itself through a hole in the front wall of the first drawer A.

The bag has the top terminal portions that form a lateral outer lap on all the walls of the frame.

The second drawer B is designed to be moved along its longitudinal axis throughout its length and is extractable.

The two drawers A and B slide on guides provided on the structure for supporting the entire apparatus.

Said second drawer B is designed to support said first drawer A by means of guides 12 of a known type.

The entire working cycle is kept under control by an electronic card, which, by means of appropriate limit-switch sensors 16 set at the end of the drawers A, B or in other strategic positions, keeps the apparatus in conditions of safety.

The apparatus moreover comprises an incremental encoder, mechanically connected to the wormscrew 1, which is associated to the motor reducer 3 for detecting its rotation.

When the wormscrew 1 is blocked, the encoder no longer emits pulses and consequently the electronic card, which controls the entire apparatus, interrupts supply of the motor reducer 3.

In the example just described, the motor reducer 3 is an a.c. motor reducer.

As an alternative to the use of the crank wrench 14 for unblocking the wormscrew 1 by turning it backwards, it is possible to unblock said wormscrew 1 automatically via the electronic control card, which, having detected blocking of the wormscrew 1 thanks to the fact that the incremental encoder no longer emits pulses due to rotation thereof, acts in the direction of rotation of the motor reducer 3, reversing it for a pre-set time after interrupting supply to the motor reducer 3 itself.

In the example just described, the motor reducer 3 is a d.c. motor reducer.

According to the invention, the apparatus is equipped with a warning light and/or acoustic indicator, designed to warn the user that the wormscrew 1 is blocked and that it is necessary to remove the object that has caused blocking of the wormscrew itself.

Said warning light and/or buzzer is activated by the electronic control card.

The means designed to operate the apparatus that is described comprise an electrical wiring system and at least two pushbuttons set on the front outer wall of the electric household appliance:
  a main ON/OFF switch;
  a start-of-compacting-cycle switch; and
  a start-of-flushing-cycle switch.

In the example described, said pushbuttons are positioned on the front wall of the first drawer A.

The present invention has been described with reference to a use in the domestic environment but can be used without any variations also in different environments, such as, for example, restaurants, canteens, etc.

The present invention has been described and illustrated according to a preferred embodiment, but it is understood that any person skilled in the branch may make equivalent modifications and/or replacements thereto, without thereby departing from the sphere of protection of the present industrial patent right.

The invention claimed is:

1. An apparatus for the compacting and dehydration of organic waste, comprising: a first drawer (A), designed to receive organic material and/or kitchen-produced foodstuff waste and equipped with mechanical means for compacting and dehydration of said foodstuff waste; and a second drawer (B), underlying the first drawer (A), designed to receive said compacted and dehydrated foodstuff waste that comes out of the first drawer (A);
  wherein said mechanical means are substantially constituted by a wormscrew (1), and wherein said wormscrew (1) is equipped with one or more cup pistons (2), which are arranged radially above the wormscrew (1) and act on the cavities of said wormscrew; the ascending movement of each piston (2) being provided by the rotation of the wormscrew (1), whilst the descending movement is provided by at least one return spring housed in the cup of each piston.

2. The apparatus according to claim 1, characterized in that the first drawer (A) moreover comprises:

means for collecting organic liquids that come out of the compacted and dehydrated foodstuff waste;

means for conveying said organic liquids to a sewer;

a motor reducer (3), designed to be connected to the wormscrew (1); and a loading and closing hatch (4), located on the top part of the wormscrew.

3. The apparatus according to claim 2, characterized in that said means for collecting organic liquids are constituted by a casing (7).

4. The apparatus according to claim 2, characterized in that said means for conveying said organic liquids to a sewer are constituted by a purposely designed pipe (8).

5. The apparatus according to claim 4, characterized in that said pipe (8) is designed to be connected to a vacuum pump (9).

6. The apparatus according to claim 4, characterized in that said pipe (8) is a telescopic pipe.

7. The apparatus according to claim 1, characterized in that said wormscrew (1) is a variable-pitch wormscrew and/or with more than one start.

8. The apparatus according to claim 2, characterized in that a structure is provided for housing said wormscrew (1), said structure being equipped with a plurality of holes for allowing the organic liquids to flow towards the means for collecting the organic liquids.

9. The apparatus according to claim 1, characterized in that one or more spray nozzles (10) are provided for cleaning the apparatus by flushing.

10. The apparatus according to claim 9, characterized in that each of said spray nozzles (10) is designed to be governed by a purposely provided timed solenoid valve or by a purposely provided electric pump.

11. The apparatus according to claim 1, characterized in that the second drawer (B) is equipped with a purposely designed bag for the collection of the compacted and dehydrated foodstuff waste.

12. The apparatus according to claim 1, characterized in that it is equipped with scraping means (17) for keeping the wormscrew (1) clean and for facilitating dropping of the compacted and dehydrated foodstuff waste into the second drawer (B); said scraping means (17) being positioned in the distal proximity of the wormscrew (1).

13. The apparatus according to claim 1, characterized in that the second drawer (B) is equipped with means for extracting the air and conveying the air towards the outside.

14. The apparatus according to claim 12, characterized in that said means for extracting the air and conveying the air towards the outside comprise a dehumidifier fan (20); said fan being positioned on the rear wall of the apparatus provided with holes.

15. The apparatus according to claim 1, further comprising means for refrigeration designed to be fixed to the load-bearing structure on which the second drawer (B) slides.

16. The apparatus according to claim 15, characterized in that said refrigeration means comprise a coil (25), designed to be fixed vertically in a central position on the base of said load-bearing structure; said second drawer (B) being equipped with a recess or tunnel that extends throughout the length of the drawer with dimensions such as not to interfere with said coil (25) when the drawer is opened or closed.

17. The apparatus according to claim 1, characterized in that an activated-carbon filter is provided for filtering the air leaving said apparatus.

18. The apparatus according to claim 2, characterized in that the second drawer (B) further comprises a rigid frame having the external side walls provided with holes and the rear wall and the front wall with double chamber for enabling housing of a wrench (14), designed to be inserted in a purposely designed attachment provided on the front wall of the first drawer (A) for enabling unblock of the wormscrew (1) in the event of clogging.

19. The apparatus according to claim 18, characterized in that the motor reducer (3) is an a.c. motor reducer and in that said apparatus comprises an incremental encoder, mechanically connected to the wormscrew (1), designed to be associated to said motor reducer (3) for detecting rotation of the motor reducer itself, as well as an electronic card designed to detect the signal of the encoder and to interrupt supply to the motor reducer (3) in the event of blocking of the wormscrew (1).

20. The apparatus according to claim 2, characterized in that the motor reducer (3) is a d.c. motor reducer and in that said apparatus comprises an incremental encoder, mechanically connected to the wormscrew (1), designed to be associated to said motor reducer (3) for detecting rotation of said motor reducer (3), as well as an electronic control card, designed to detect the signal of the encoder and to act on the direction of rotation of said motor reducer (3), reversing the direction of rotation of the motor reducer for a pre-set time in order to unblock the wormscrew (1), and then interrupt supply to the motor reducer (3).

21. The apparatus according to claim 19, characterized in that the electronic card is designed to control an entire working cycle via appropriate sensors and/or limit switches (16) for maintaining the apparatus itself in conditions of safety and for indicating that the wormscrew (1) is blocked.

22. The apparatus according to claim 19, further comprising a light and/or acoustic indicator to warn the user that the wormscrew (1) is blocked; said light and/or acoustic indicator being activated by the electronic control card.

23. The apparatus according to claim 1, further comprising actuator means that comprise an electrical wiring system and at least two pushbuttons on the front wall of the apparatus: a main ON/OFF switch; a start-of-compacting-cycle switch; and a start-of-flushing-cycle switch.

24. The apparatus according to claim 1, characterized in that the second drawer (B) further comprises a rigid frame having the external side walls provided with holes and the rear wall and the front wall with double chamber for enabling housing of a wrench (14), designed to be inserted in a purposely designed attachment provided on the front wall of the first drawer (A) for enabling unblock of the wormscrew (1) in the event of clogging.

25. An apparatus for the compacting and dehydration of organic waste, characterized in that it comprises: a first drawer (A), designed to receive organic material and/or kitchen-produced foodstuff waste and equipped with mechanical means for compacting and dehydration of said foodstuff waste; and a second drawer (B), underlying the first drawer (A), designed to receive said compacted and dehydrated foodstuff waste that comes out of the first drawer (A); wherein said mechanical means are substantially constituted by a wormscrew (1), and scraping means (17) for keeping the wormscrew (1) clean and for facilitating dropping of the compacted and dehydrated foodstuff waste into the second drawer (B); said scraping means (17) being positioned in the distal proximity of the wormscrew (1).

\* \* \* \* \*